(12) United States Patent
Wang

(10) Patent No.: US 10,387,258 B2
(45) Date of Patent: Aug. 20, 2019

(54) METHOD AND APPARATUS FOR PROCESSING REDO DATA IN DATABASE

(71) Applicant: Huawei Technologies Co., Ltd., Shenzhen, Guangdong (CN)

(72) Inventor: Nan Wang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1038 days.

(21) Appl. No.: 14/828,146

(22) Filed: Aug. 17, 2015

(65) Prior Publication Data

US 2015/0355975 A1 Dec. 10, 2015

Related U.S. Application Data

(63) Continuation of application No. PCT/CN2013/084687, filed on Sep. 30, 2013.

(30) Foreign Application Priority Data

Mar. 26, 2013 (CN) .......................... 2013 1 0101317

(51) Int. Cl.
*G06F 16/23* (2019.01)
*G06F 11/14* (2006.01)

(52) U.S. Cl.
CPC ...... *G06F 11/1435* (2013.01); *G06F 11/1464* (2013.01); *G06F 16/2343* (2019.01);
(Continued)

(58) Field of Classification Search
CPC ............. G06F 11/1435; G06F 16/2358; G06F 16/2343; G06F 11/1464; G06F 2201/84; G06F 2201/80
See application file for complete search history.

(56) References Cited

U.S. PATENT DOCUMENTS 7,412,460 B2  8/2008  Hrle et al.
7,415,466 B2 *  8/2008  Ganesh .............. G06F 11/1471
(Continued)

FOREIGN PATENT DOCUMENTS

CN    1842789 A    10/2006
CN    1920780 A    2/2007
(Continued)

OTHER PUBLICATIONS

Li Shengtao, "Research about Improvement of Data Migration Based on Oracle Database", Soochow University, Dec. 6, 2010, 71 pages.

*Primary Examiner* — Jorge A Casanova

(57) ABSTRACT

Embodiments of the present invention provide a method and an apparatus for processing redo data in a database, where the method includes: generating redo data according to a database modification operation, accordingly saving the redo data in a buffer allocated to each application thread, saving an identifier of the application thread in a time sequence queue after a time sequence queue lock is acquired; and determining that a data reading condition is satisfied, reading a sequence of the identifiers of the application threads from the time sequence queue, successively reading a piece of redo data from the buffer of each application thread corresponding to the identifier of each application thread in the time sequence queue, and writing the piece of redo data to a redo queue. Redo data processing efficiency can be improved by separating a time sequence queue from a data queue.

10 Claims, 3 Drawing Sheets

(52) U.S. Cl.
CPC ...... *G06F 16/2358* (2019.01); *G06F 2201/80* (2013.01); *G06F 2201/84* (2013.01)

(56) References Cited

U.S. PATENT DOCUMENTS

| | | |
|---|---|---|
| 2004/0073781 A1 | 4/2004 | Hokenek et al. |
| 2005/0004996 A1 | 1/2005 | Nagai et al. |
| 2005/0216462 A1 | 9/2005 | Xiao |
| 2011/0282850 A1 | 11/2011 | Kamra et al. |

FOREIGN PATENT DOCUMENTS

| | | |
|---|---|---|
| CN | 100428282 C | 10/2008 |
| CN | 101794247 A | 8/2010 |
| CN | 102195795 A | 9/2011 |
| CN | 102243648 A | 11/2011 |
| CN | 102945278 A | 2/2013 |
| CN | 103150149 A | 6/2013 |
| EP | 0758114 A1 | 2/1997 |
| JP | 05316309 A | 11/1993 |
| JP | 8235042 A | 9/1996 |
| JP | 09282296 A | 10/1997 |
| JP | 2004287932 A | 10/2004 |
| WO | WO 03/009139 A1 | 1/2003 |
| WO | WO 2007/129287 A1 | 11/2007 |
| WO | WO 2009/108409 A1 | 9/2009 |

\* cited by examiner

METHOD AND APPARATUS FOR PROCESSING REDO DATA IN DATABASE

CROSS-REFERENCE TO RELATED APPLICATIONS

This application is a continuation of International Application PCT/CN2013/084687, filed on Sep. 30, 2013, which claims priority to Chinese Patent Application No. 201310101317.X, filed on Mar. 26, 2013, both of which are hereby incorporated by reference in their entireties.

TECHNICAL FIELD

The present invention relates to the field of communications network technologies, and in particular, to a method and an apparatus for processing redo data in a database.

BACKGROUND

A redo log (redo log) is an important guarantee of data reliability in a database operation, and can provide more data security protection than a file system. A basic principle of the redo log is as follows: When a database modification operation is committed, data is not instantly written to a data file on a magnetic disk, but is saved in a memory, which avoids writing a database update requirement to the data file each time, and therefore improves database update performance; redo data (redo data) is generated according to the modification operation, and is written to the magnetic disk as a redo log, avoiding a data loss caused by a memory data loss in the case of a failure. When a failure occurs during a database operation, data may be restored by using a persistent redo log.

In most existing database applications, to improve concurrent throughput performance of a system, a database provides an access manner of multithread concurrent processing. Although multiple threads may gain access to the database concurrently, before multiple pieces of redo data are written to a magnetic disk, the multiple pieces of redo data need to be temporarily stored in a redo queue (redo queue) and then successively written to the magnetic disk, so as to improve efficiency of writing the magnetic disk. Redo data has a time sequence limitation; therefore, when multiple threads copy redo data to a redo queue, it is required to ensure a time sequence within a protection scope of a global redo queue lock. That is, for redo data writing each time, time-consuming data copying needs to be performed after the redo queue lock is preempted.

In the prior art, multiple threads can generate and copy redo data only in a serial manner, which therefore contains a defect of low redo data processing efficiency, affecting a system throughput in application of concurrent heavy service traffic.

SUMMARY

Embodiments of the present invention provide a method and an apparatus for processing redo data in a database, which are used to improve redo data processing performance.

According to a first aspect, an embodiment of the present invention provides a method for processing redo data in a database, where the method is applied to a server, a data reading thread and multiple application threads run on the server, the multiple application threads modify the database in a concurrent manner, and the method includes: generating, by each application thread of the multiple application threads, redo data according to a database modification operation, accordingly saving the redo data in a buffer allocated to each application thread, saving an identifier of the each application thread in a time sequence queue after a time sequence queue lock is acquired, and releasing the time sequence queue lock after the saving ends; and determining, by the data reading thread, that a data reading condition is satisfied, reading a sequence of the identifiers of the application threads from the time sequence queue, successively reading a piece of redo data from the buffer of the application thread corresponding to the identifier of the application thread in the time sequence queue, and writing the piece of redo data to a redo queue.

In a first possible implementation manner of the first aspect, the data reading condition is that a predetermined time period ends, or a length of the time sequence queue reaches a predetermined value, or an amount of temporarily stored data of the application thread reaches a predetermined value.

With reference to the first aspect or the first possible implementation manner of the first aspect, in a second possible implementation manner, before the successively reading a piece of redo data from the buffer of the application thread corresponding to the identifier of the application thread in the time sequence queue, and writing the piece of redo data to a redo queue, the method further includes: acquiring a redo queue lock, so as to acquire write permission on the redo queue; and after the successively reading a piece of redo data from the buffer of each application thread corresponding to the identifier of each application thread in the time sequence queue, and writing the piece of redo data to a redo queue, the method further includes: releasing the redo queue lock.

With reference to the first aspect or the first possible implementation manner of the first aspect or the second possible implementation manner of the first aspect, in a third possible implementation manner, before the successively reading a piece of redo data from the buffer of the application thread corresponding to the identifier of the application thread in the time sequence queue, and writing the piece of redo data to a redo queue, the method further includes: acquiring a time sequence queue lock, so as to lock the time sequence queue, and after the successively reading a piece of redo data from the buffer of each application thread corresponding to the identifier of each application thread in the time sequence queue, and writing the piece of redo data to a redo queue, the method further includes: releasing the time sequence queue lock; or before the successively reading a piece of redo data from the buffer of each application thread corresponding to the identifier of each application thread in the time sequence queue, and writing the piece of redo data to a redo queue, the method further includes: adding a reading ending identifier to an element at the tail of the time sequence queue.

With reference to the first aspect and any one of the first to the third possible implementation manners of the first aspect, in a fourth possible implementation manner, after the successively reading a piece of redo data from the buffer of the application thread corresponding to the identifier of the application thread in the time sequence queue, and writing the piece of redo data to a redo queue, the method further includes: deleting the identifier of the application thread from the time sequence queue.

According to a second aspect, an embodiment of the present invention provides a server for processing redo data in a database, where multiple application threads run in the server, the multiple application threads modify the database in a concurrent manner, and the server includes:

a time sequence queue processing unit, configured to: enable each application thread of the multiple application threads to generate redo data according to a database modification operation, accordingly save the redo data in a buffer allocated to each application thread, save an identifier of the each application thread in a time sequence queue after a time sequence queue lock is acquired, and release the time sequence queue lock and send the time sequence queue to a redo queue processing unit after the saving ends; and the redo queue processing unit, configured to: receive the time sequence queue from the time sequence queue processing unit, read a sequence of the identifiers of the application threads from the time sequence queue after determining that a data reading condition is satisfied, successively read a piece of redo data from the buffer of each application thread corresponding to the identifier of each application thread in the time sequence queue, and write the piece of redo data to a redo queue.

In a first possible implementation manner of the first aspect, that the redo queue processing unit determines that the data reading condition is satisfied specifically includes that the redo queue processing unit determines that a predetermined time period ends, or a length of the time sequence queue reaches a predetermined value, or an amount of temporarily stored data of the application thread reaches a predetermined value.

With reference to the first aspect or the first possible implementation manner of the first aspect, in a second possible implementation manner, the redo queue processing unit is further configured to: before the successively reading a piece of redo data from the buffer of the application thread corresponding to the identifier of the application thread in the time sequence queue, and writing the piece of redo data to a redo queue, acquire a redo queue lock, so as to acquire write permission on the redo queue; and after the successively reading a piece of redo data from the buffer of each application thread corresponding to the identifier of each application thread in the time sequence queue, and writing the piece of redo data to a redo queue, release the redo queue lock.

With reference to the first aspect or the first possible implementation manner of the first aspect or the second possible implementation manner of the first aspect, in a third possible implementation manner, the redo queue processing unit is further configured to: before the successively reading a piece of redo data from the buffer of the application thread corresponding to the identifier of the application thread in the time sequence queue, and writing the piece of redo data to a redo queue, acquire a time sequence queue lock, so as to lock the time sequence queue, and after the successively reading a piece of redo data from the buffer of each application thread corresponding to the identifier of each application thread in the time sequence queue, and writing the piece of redo data to a redo queue, release the time sequence queue lock; or before the successively reading a piece of redo data from the buffer of the application thread corresponding to the identifier of the application thread in the time sequence queue, and writing the piece of redo data to a redo queue, add a reading ending identifier to an element at the tail of the time sequence queue.

With reference to the first aspect and any one of the first to the third possible implementation manners of the first aspect, in a fourth possible implementation manner, the redo queue processing unit is further configured to: after reading the piece of redo data from the buffer of the application thread corresponding to the identifier of the application thread in the time sequence queue, and writing the piece of redo data to the redo queue, delete the identifier of the application thread from the time sequence queue.

It can be learned from the foregoing technical solutions that in embodiments of the present invention, an application thread is used to generate redo data, the redo data is saved in a buffer allocated to the application thread, and an identifier of the each application thread is saved in a time sequence queue; and after a data reading condition is satisfied, a sequence of the identifiers of the application threads is read from the time sequence queue, redo data is successively read from the buffer of the application thread and written to a redo queue, thereby improving redo data processing efficiency and increasing a concurrent throughput of a database system.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments acquired by a person of ordinary skill in the art based on the embodiments of the present invention without creative efforts shall fall within the protection scope of the present invention.

Figure 1:
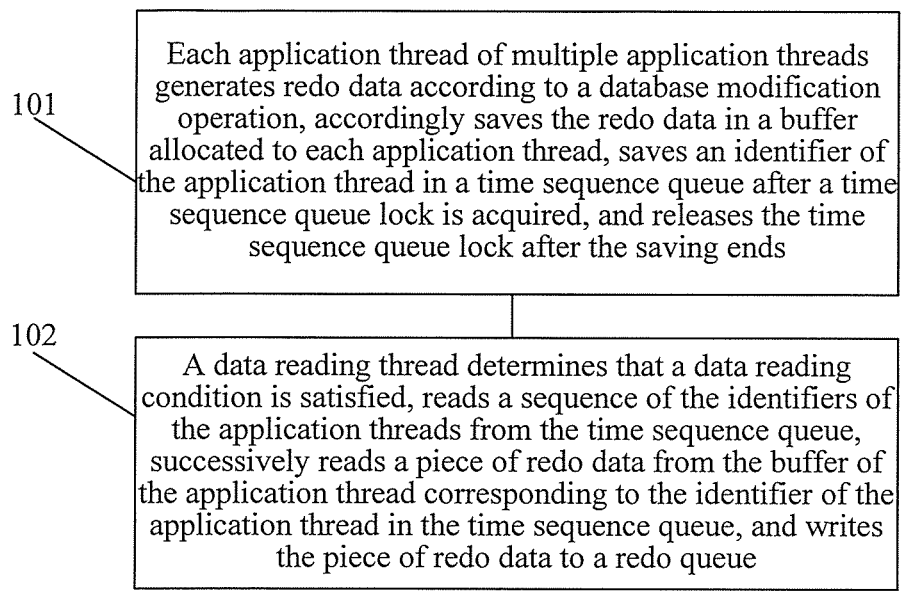
FIG. 1 is a flowchart of a method for processing redo data in a database according to an embodiment of the present invention.

An embodiment of the present invention provides a method for processing redo data in a database, where the method is applied to a server, a data reading thread and multiple application threads run on the server, the multiple application threads modify the database in a concurrent manner, and referring to FIG. 1, the method includes:

Step 101: Each application thread of the multiple application threads generates redo data according to a database modification operation, accordingly saves the redo data in a buffer allocated to each application thread, saves an identifier of the each application thread in a time sequence queue after a time sequence queue lock is acquired, and releases the time sequence queue lock after the saving ends.

Step 102: The data reading thread determines that a data reading condition is satisfied, reads a sequence of the identifiers of the application threads from the time sequence queue, successively reads a piece of redo data from the buffer of each application thread corresponding to the identifier of each application thread in the time sequence queue, and writes the piece of redo data to a redo queue.

The data reading condition is specifically that a predetermined time period ends, or a length of the time sequence queue reaches a predetermined value, or an amount of temporarily stored data of the application thread reaches a predetermined value.

Optionally, before the successively reading a piece of redo data from the buffer of the application thread corresponding to the identifier of the application thread in the time sequence queue, and writing the piece of redo data to a redo queue, the method further includes: acquiring a redo queue lock, so as to acquire write permission on the redo queue; and after the successively reading a piece of redo data from the buffer of each application thread corresponding to the identifier of each application thread in the time sequence queue, and writing the piece of redo data to a redo queue, the method further includes: releasing the redo queue lock.

Optionally, before the successively reading a piece of redo data from the buffer of each application thread corresponding to the identifier of each application thread in the time sequence queue, and writing the piece of redo data to a redo queue, the method further includes: acquiring a time sequence queue lock, so as to lock the time sequence queue, and after the successively reading a piece of redo data from the buffer of each application thread corresponding to the identifier of each application thread in the time sequence queue, and writing the piece of redo data to a redo queue, the method further includes: releasing the time sequence queue lock; or before the successively reading a piece of redo data from the buffer of each application thread corresponding to the identifier of each application thread in the time sequence queue, and writing the piece of redo data to a redo queue, the method further includes: adding a reading ending identifier to an element at the tail of the time sequence queue.

Optionally, after the successively reading a piece of redo data from the buffer of each application thread corresponding to the identifier of each application thread in the time sequence queue, and writing the piece of redo data to a redo queue, the method further includes: deleting the identifier of the application thread from the time sequence queue.

Figure 2:
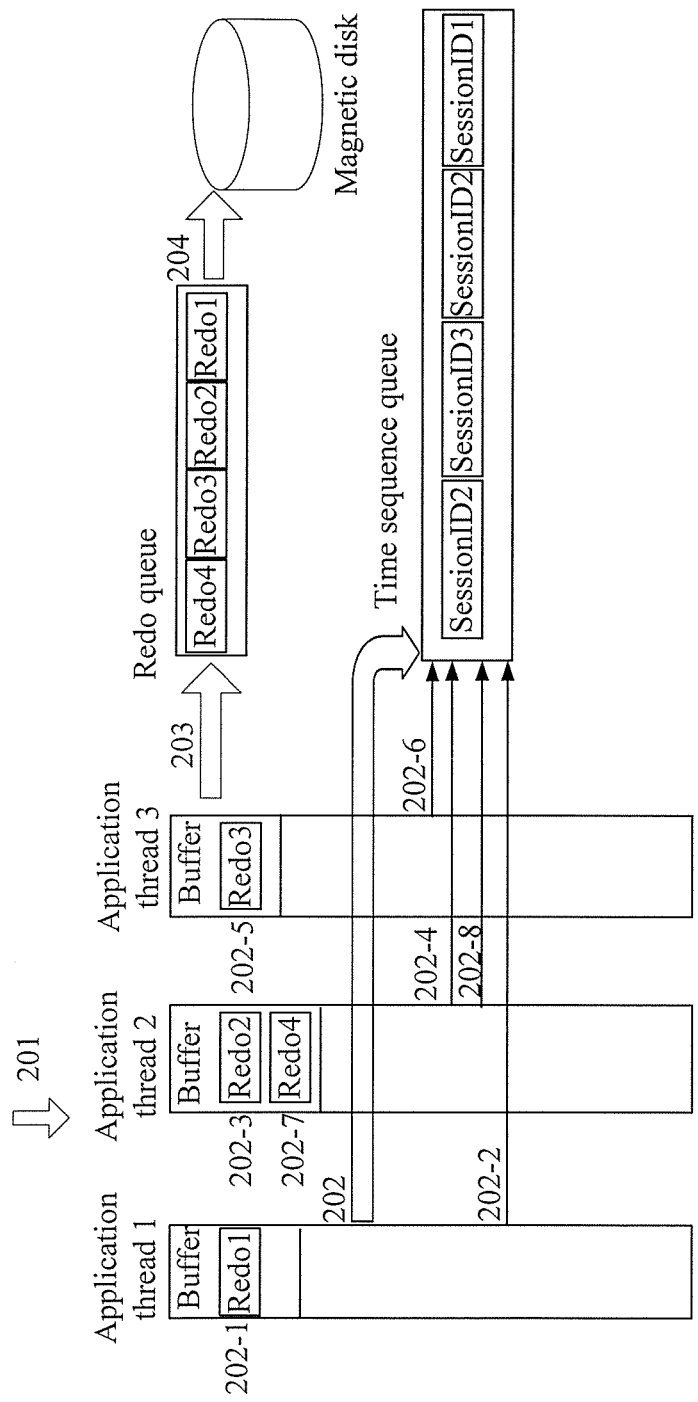
FIG. 2 is a signaling flowchart of a method for processing redo data in a database according to another embodiment of the present invention.

Another embodiment of the present invention provides a signaling flowchart of a method for processing redo data in a database. Referring to FIG. 2, a specific process includes:

Step 201: After receiving, from a terminal, an instruction to access a database, a server starts multiple application threads to concurrently modify the database, allocates a separate buffer to each application thread, and starts a data reading thread.

Specifically, in this embodiment, there are three application threads that concurrently modify the database, and thread identifiers of the three application threads are a SessionID1, a SessionID2, and a SessionID3.

Step 202: After generating redo data according to a database modification operation, any of the application threads saves the redo data in the buffer allocated to the application thread, saves an identifier of the each application thread in a time sequence queue after a time sequence queue lock is acquired, and releases the time sequence queue lock after the saving ends.

Specifically, in this embodiment, operation substeps of the three application threads in step 202 are as follows:

Step 202-1: An application thread 1 modifies the database, generates redo data Redo1 according to the modification operation, and saves the Redo1 in a buffer of the application thread 1.

Step 202-2: The application thread 1 locks the time sequence queue, that is, acquires the time sequence queue lock, therefore acquires write permission on the time sequence queue, and saves the identifier SessionID1 of the application thread 1 in the time sequence queue. After the saving, the time sequence queue includes only one application thread identifier, namely, SessionID1, and the application thread 1 unlocks the time sequence queue, that is, releases the time sequence queue lock. After the write permission on the time sequence queue is acquired by locking the time sequence queue, another application thread cannot simultaneously perform an operation of writing the time sequence queue, thereby ensuring a time sequence of the identifier, which is saved in the time sequence queue, of the application thread. Only a write operation of one piece of integer data needs to be performed after the locking; therefore, locking time of the time sequence queue is extremely short, and concurrency of the multiple threads is high.

Step 202-3: An application thread 2 modifies the database, generates redo data Redo2 according to the modification operation, and saves the Redo2 in a buffer of the application thread 2.

Step 202-4: After locking the time sequence queue, the application thread 2 saves the identifier SessionID2 of the application thread 2 in the time sequence queue, where application thread identifiers included in the time sequence queue are the SessionID1 and the SessionID2 after the saving, and the application thread 2 interprets the time sequence queue. The queue has a first-in-first-out characteristic; therefore, the application thread identifiers included in the time sequence queue are stored according to a saving sequence.

Step 202-5: An application thread 3 modifies the database, generates redo data Redo3 according to the modification operation, and saves the Redo3 in a buffer of the application thread 3.

Step 202-6: After locking the time sequence queue, the application thread 3 saves the identifier SessionID3 of the application thread 3 in the time sequence queue, where application thread identifiers included in the time sequence queue are the SessionID1, the SessionID2, and the SessionID3 after the saving, and the application thread 3 unlocks the time sequence queue.

Step 202-7: The application thread 2 modifies the database again, generates redo data Redo4 according to the modification operation, and saves the Redo4 in the buffer of the application thread 2. The buffer uses a data structure of a queue, and has a first-in-first-out characteristic; therefore, the redo data Redo2 and the redo data Redo4 are stored in the buffer according to a generating sequence.

Step 202-8: After locking the time sequence queue, the application thread 2 saves the identifier SessionID2 of the application thread 2 in the time sequence queue, where application thread identifiers included in the time sequence queue are the SessionID1, the SessionID2, the SessionID3, and the SessionID2 after the saving, and the application thread 2 unlocks the time sequence queue.

Step 203: After determining that a data reading condition is satisfied, the data reading thread reads a sequence of the identifiers of the application threads from the time sequence queue, successively reads a piece of redo data from the buffer of each application thread corresponding to the identifier of each application thread in the time sequence queue, and writes the piece of redo data to a redo queue.

The data reading condition may be that a predetermined time period ends, or a length of the time sequence queue reaches a predetermined value, or an amount of temporarily stored data of the application thread reaches a predetermined value. Optionally, multiple different types of data reading conditions may be simultaneously set on the server, and when any of the conditions is satisfied, a data reading operation needs to be performed. For example, it may be simultaneously set that a first data reading condition is that the time period is 10 s, and a second data reading condition is that the amount of temporarily stored data of the application thread reaches 10. By setting the time period, it is avoided that redo data retains in a buffer for excessively long time in the case of non-frequent database operations. By setting a buffer threshold of the application thread, it is avoided that data in the buffer cannot be processed in time in the case of frequent database operations. Specifically, in this embodiment, the data reading condition is set to be that the length of the time sequence queue reaches 4.

For the step of reading the sequence of the identifier of the application thread from the time sequence queue, successively reading a piece of redo data from the buffer of each application thread corresponding to the identifier of each application thread in the time sequence queue, and writing the piece of redo data to the redo queue, a specific implementation method may be as follows: The time sequence queue is traversed, a piece of redo data in the buffer of the application thread corresponding to each identifier, which is acquired by traversing, of the application thread is read, and the piece of redo data is written to the redo queue.

In a process of successively reading redo data from the buffer of each application thread corresponding to the identifier of each application thread in the time sequence queue, it is possible that a new identifier of an application thread is saved in the time sequence queue. Therefore, to reduce interference to the current operation of successively reading the redo data, and improve data reading efficiency, before the current operation of successively reading the redo data, the time sequence queue may be locked, that is, the time sequence queue lock may be acquired, so as to acquire the write permission on the time sequence queue, and prevent a new identifier of an application thread from being saved in the time sequence queue. The time sequence queue lock is not released until the current operation of reading the redo data ends. An application waits, and can save a new identifier of an application thread in the time sequence queue after acquiring the time sequence queue lock. Alternatively, before the current operation of successively reading the redo data, a reading ending identifier is added to an element at the tail of the time sequence queue. In this case, saving of a new identifier of an application thread is allowed; however, the current operation of reading the redo data stops when the reading ending identifier is detected.

Optionally, it is allowed to simultaneously set multiple different types of data reading conditions; therefore, after it is determined that the first data reading condition is satisfied, it may be detected, in the process of successively reading the redo data and writing the redo data to the redo queue, that the second data reading condition is satisfied. To avoid a new operation of reading data and writing the data to the redo queue caused by the second data reading condition, after it is determined that the first data reading condition is satisfied, and before the operation of successively reading the redo data and writing the redo data to the redo queue is performed, the redo queue is locked, so as to acquire the write permission on the redo queue, thereby avoiding that a new operation of writing data to the redo queue is performed simultaneously. The data reading thread can allocate, according to the second data reading condition, a redo queue lock to a new operation of reading redo data only after the first performed operation of successively reading the redo data and writing the redo data to the redo queue ends and the redo queue lock is released, so that the new operation of reading the redo data and writing the redo data to the redo queue is performed.

After the successively reading a piece of redo data from the buffer of the application thread corresponding to the identifier of the application thread in the time sequence queue, and writing the piece of redo data to a redo queue, the method further includes: deleting the identifier, which is in the time sequence queue, of the application thread from the time sequence queue.

Specifically, in this embodiment, a detailed operation process of the data reading thread in step 203 is as follows:

After determining that the length of the time sequence queue is 4, the data reading thread adds the reading ending identifier to the element, that is, the fourth element, at the tail of the time sequence queue, and traverses the time sequence queue; therefore, in the process of reading the redo data, the three application threads may further continue to perform the database modification operation, that is, add redo data to the buffers, and add the identifiers of the application threads to the time sequence queue. The reading ending identifier is added in a manner of adding a StopFlag attribute to each element in the queue and independently setting a value of the StopFlag attribute of the element at the tail of the queue to 1.

After the data reading thread acquires, by traversing, that the identifier of the first application thread is the SessionID1, the data reading thread reads a piece of redo data from the buffer of the application thread 1 corresponding to the SessionID1 and writes the piece of redo data to the redo queue. The buffer has a first-in-first-out structure; therefore, the first piece of data the Redo1 is read, the second piece of data becomes the first piece of data after the reading, and the data reading thread deletes the SessionID1 from the time sequence queue. In this case, data included in the redo queue is the Redo1.

After the data reading thread acquires, by traversing, that the identifier of the second application thread is the SessionID2, the data reading thread reads a piece of redo data, that is, the Redo2, from the buffer of the application thread 2 corresponding to the SessionID2 and writes the piece of redo data to the redo queue. After the reading, the Redo4 becomes the first piece of redo data in the buffer of the application thread 2, and the data reading thread deletes the SessionID2 from the time sequence queue. In this case, data included in the redo queue is the Redo1 and the Redo2.

After the data reading thread acquires, by traversing, that the identifier of the third application thread is the SessionID3, the data reading thread reads a piece of redo data, that is, the Redo3, from the buffer of the application thread 3 corresponding to the SessionID3, writes the piece of redo data to the redo queue, and deletes the SessionID3 from the time sequence queue. In this case, data included in the redo queue is the Redo1, the Redo2, and the Redo3.

After the data reading thread acquires, by traversing, that the identifier of the fourth application thread is the SessionID2, the data reading thread reads a piece of redo data, that is, the Redo4, from the buffer of the application thread 2 corresponding to the SessionID2, writes the piece of redo data to the redo queue, and deletes the SessionID2 from the time sequence queue. In this case, data included in the redo queue is the Redo1, the Redo2, the Redo3, and the Redo4. When the fourth element is traversed, the reading ending identifier is detected; therefore, the current operation of reading the redo data stops.

Step 204: Write the redo data in the redo queue to a magnetic disk.

Specifically, it may be that the data reading thread instantly writes all the redo data in the redo queue to the magnetic disk at a time after the current operation of reading the redo data is completed.

Figure 3:
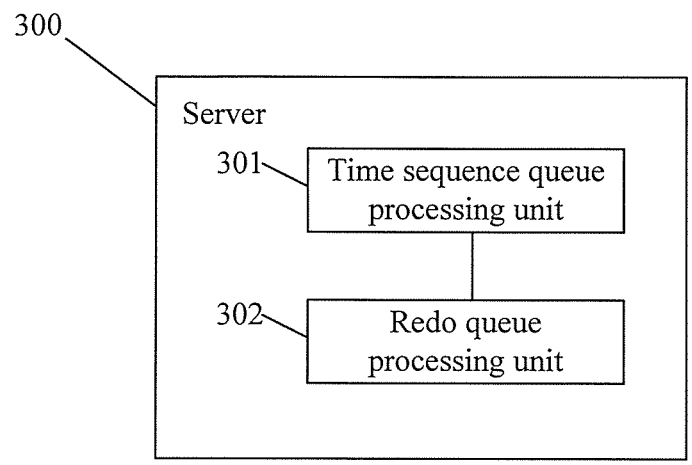
FIG. 3 is a structural diagram of an apparatus for processing redo data in a database according to an embodiment of the present invention.

An embodiment of the present invention provides a server for processing redo data in a database, where multiple application threads run on the server, and the multiple application threads modify the database in a concurrent manner. Referring to FIG. 3, a server 300 includes:

a time sequence queue processing unit 301, configured to: enable each application thread of the multiple application threads to generate redo data according to a database modification operation, accordingly save the redo data in a buffer allocated to each application thread, save an identifier of the each application thread in a time sequence queue after a time sequence queue lock is acquired, and release the time sequence queue lock and send the time sequence queue to a redo queue processing unit 302 after the saving ends; and the redo queue processing unit 302, configured to: receive the time sequence queue from the time sequence queue processing unit 301, read a sequence of the identifiers of the application threads from the time sequence queue after determining that a data reading condition is satisfied, successively read a piece of redo data from the buffer of each application thread corresponding to the identifier of each application thread in the time sequence queue, and write the piece of redo data to a redo queue.

Optionally, that the redo queue processing unit 302 determines that the data reading condition is satisfied specifically includes determining that a predetermined time period ends, or a length of the time sequence queue reaches a predetermined value, or an amount of temporarily stored data of the application thread reaches a predetermined value.

Optionally, the redo queue processing unit 302 is further configured to: before the successively reading a piece of redo data from the buffer of each application thread corresponding to the identifier of each application thread in the time sequence queue, and writing the piece of redo data to a redo queue, acquire a redo queue lock, so as to acquire write permission on the redo queue; and after the successively reading a piece of redo data from the buffer of each application thread corresponding to the identifier of each application thread in the time sequence queue, and writing the piece of redo data to a redo queue, release the redo queue lock.

Optionally, the redo queue processing unit 302 is further configured to: before the successively reading a piece of redo data from the buffer of each application thread corresponding to the identifier of each application thread in the time sequence queue, and writing the piece of redo data to a redo queue, acquire a time sequence queue lock, so as to lock the time sequence queue, and after the successively reading a piece of redo data from the buffer of each application thread corresponding to the identifier of each application thread in the time sequence queue, and writing the piece of redo data to a redo queue, release the time sequence queue lock; or before the successively reading a piece of redo data from the buffer of each application thread corresponding to the identifier of each application thread in the time sequence queue, and writing the piece of redo data to a redo queue, add a reading ending identifier to an element at the tail of the time sequence queue.

Optionally, the redo queue processing unit 302 is further configured to delete the identifier of the application thread from the time sequence queue after reading the piece of redo data from the buffer of each application thread corresponding to the identifier of each application thread in the time sequence queue, and writing the piece of redo data to the redo queue.

Figure 4:
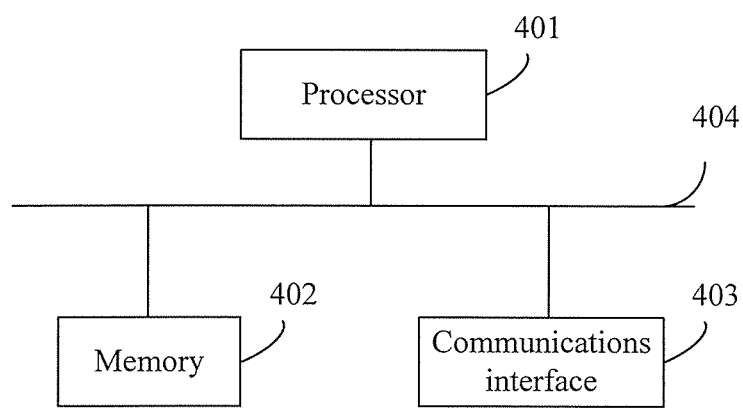
FIG. 4 is a structural diagram of an apparatus for processing redo data in a database based on a computer system according to an embodiment of the present invention.

A server in an embodiment of the present invention may be implemented based on a computer system, and the methods shown in FIG. 1 and FIG. 2 may be implemented on the server based on a computer system. FIG. 4 shows an embodiment of a server that is implemented based on a computer system. In this embodiment, the server may include a processor 401, a memory 402, and a communications interface 403, where:

the communications interface 403 is configured to communicate with a terminal. All messages exchanged between the server and the terminal are sent and received by using the communications interface 403. Specifically, the communications interface 403 is configured to receive, from the terminal, an instruction to access a database; the memory 402 is configured to store a program instruction; and the processor 401 is configured to: after the instruction to access the database is received from the terminal, invoke the program instruction stored in the memory 402 to perform the following operations: starting a data reading thread and multiple application threads, where the multiple application threads modify the database in a concurrent manner, and each application thread of the multiple application threads generates redo data according to a database modification operation, accordingly saves the redo data in a buffer allocated to each application thread, saves an identifier of the each application thread in a time sequence queue after a time sequence queue lock is acquired, and releases the time sequence queue lock after the saving ends; and the data reading thread determines that a data reading condition is satisfied, reads a sequence of the identifiers of the application threads from the time sequence queue, successively reads a piece of redo data from the buffer of each application thread corresponding to the identifier of each application thread in the time sequence queue, and writes the piece of redo data to a redo queue.

The processor 401 may be a central processing unit (central processing unit, CPU), an application-specific integrated circuit (application-specific integrated circuit, ASIC), or the like. The server in this embodiment may include a bus 404. The processor 401, the memory 402, and the communications interface 403 may connect to each other and communicate with each other by using the bus 404. The memory 402 may include an entity that has a storing function, such as a random access memory (random access memory, RAM), a read-only memory (read-only memory, ROM), a magnetic disk, or the like.

The processor 401 may further be configured to perform steps of a server in the method embodiments shown in FIG. 1 and FIG. 2. In this embodiment of the present invention, details are not described herein again.

The foregoing is a detailed description of a method and an apparatus for processing redo data in a database provided in the present invention. Specific examples are used in this specification to describe the principle and implementation manners of the present invention. The descriptions of the foregoing embodiments are merely intended to help understand the method and core idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method for processing redo data in a database, wherein the method is applied to a server, a data reading thread and multiple application threads run on the server, the multiple application threads modify the database in a concurrent manner, the method comprising:
generating, by each application thread of the multiple application threads, redo data according to a database modification operation, saving the redo data in a buffer allocated to each application thread, saving an identifier of the each application thread in a time sequence queue after a time sequence queue lock is acquired, and releasing the time sequence queue lock after the saving ends; and
determining, by the data reading thread, that a data reading condition is satisfied, reading a sequence of the identifiers of the application threads from the time sequence queue, successively reading a piece of redo data from the buffer of each application thread corresponding to the identifier of each application thread in the time sequence queue, and writing the piece of redo data to a redo queue.

2. The method according to claim 1, wherein the data reading condition comprises: a predetermined time period ends, a length of the time sequence queue reaches a predetermined value, or an amount of temporarily stored data of the application thread reaches a predetermined value.

3. The method according to claim 1, wherein:
before successively reading a piece of redo data from the buffer of each application thread corresponding to the identifier of each application thread in the time sequence queue, and writing the piece of redo data to a redo queue, the method further comprises: acquiring a redo queue lock, so as to acquire write permission on the redo queue; and
after successively reading a piece of redo data from the buffer of each application thread corresponding to the identifier of each application thread in the time sequence queue, and writing the piece of redo data to a redo queue, the method further comprises: releasing the redo queue lock.

4. The method according to claim 1, wherein:
before successively reading a piece of redo data from the buffer of each application thread corresponding to the identifier of each application thread in the time sequence queue, and writing the piece of redo data to a redo queue, the method further comprises: acquiring a time sequence queue lock, so as to lock the time sequence queue, and after successively reading a piece of redo data from the buffer of each application thread corresponding to the identifier of each application thread in the time sequence queue, and writing the piece of redo data to a redo queue, the method further comprises: releasing the time sequence queue lock; or
before successively reading a piece of redo data from the buffer of each application thread corresponding to the identifier of each application thread in the time sequence queue, and writing the piece of redo data to a redo queue, the method further comprises: adding a reading ending identifier to an element at the tail of the time sequence queue.

5. The method according to claim 1, wherein after successively reading a piece of redo data from the buffer of each application thread corresponding to the identifier of each application thread in the time sequence queue, and writing the piece of redo data to a redo queue, the method further comprises:
deleting the identifier of the application thread from the time sequence queue.

6. A server for processing redo data in a database, wherein multiple application threads run on the server and the multiple application threads modify the database in a concurrent manner, the server comprising:
a time sequence queue processing unit, configured to:
successively enable each application thread of the multiple application threads to generate redo data according to a database modification operation,
save the redo data in a buffer allocated to each application thread,
save an identifier of the each application thread in a time sequence queue after a time sequence queue lock is acquired, and
release the time sequence queue lock and send the time sequence queue to a redo queue processing unit after the saving ends; and
a redo queue processing unit, configured to:
receive the time sequence queue from the time sequence queue processing unit,
read a sequence of the identifiers of the application threads from the time sequence queue after determining that a data reading condition is satisfied,
successively read a piece of redo data from the buffer of each application thread corresponding to the identifier of each application thread in the time sequence queue, and
write the piece of redo data to a redo queue.

7. The server according to claim 6, wherein the redo queue processing unit is further configured to:
determine that a predetermined time period ends, a length of the time sequence queue reaches a predetermined value, or an amount of temporarily stored data of the application thread reaches a predetermined value.

8. The server according to claim 6, wherein the redo queue processing unit is further configured to:
before successively reading a piece of redo data from the buffer of each application thread corresponding to the identifier of each application thread in the time sequence queue, and writing the piece of redo data to a redo queue, acquire a redo queue lock, so as to acquire write permission on the redo queue; and
after successively reading a piece of redo data from the buffer of each application thread corresponding to the identifier of each application thread in the time sequence queue, and writing the piece of redo data to a redo queue, release the redo queue lock.

9. The server according to claim 6, wherein the redo queue processing unit is further configured to:
before successively reading a piece of redo data from the buffer of the application thread corresponding to the identifier of the application thread in the time sequence queue, and writing the piece of redo data to a redo queue, acquire a time sequence queue lock, so as to lock the time sequence queue, and after successively reading a piece of redo data from the buffer of the application thread corresponding to the identifier of the application thread in the time sequence queue, and writing the piece of redo data to a redo queue, release the time sequence queue lock; or
before successively reading a piece of redo data from the buffer of each application thread corresponding to the identifier of each application thread in the time sequence queue, and writing the piece of redo data to a redo queue, add a reading ending identifier to an element at the tail of the time sequence queue.

10. The server according to claim 6, wherein after reading the piece of redo data from the buffer of the application thread corresponding to the identifier of the application thread in the time sequence queue, and writing the piece of redo data to the redo queue, the redo queue processing unit is further configured to:

delete the identifier of the application thread from the time sequence queue.

\* \* \* \* \*